US008337028B2

(12) United States Patent
Tatehata et al.

(10) Patent No.: US 8,337,028 B2

(45) Date of Patent: Dec. 25, 2012

(54) LIGHT GUIDE SHEET AND MOVABLE CONTACT ASSEMBLY USING THE SAME

(75) Inventors: Naoki Tatehata, Kyoto (JP); Yousuke Chikahisa, Hyogo (JP)

(73) Assignee: Panasonic Corporation, Osaka (JP)

( * ) Notice: Subject to any disclaimer, the term of this patent is extended or adjusted under 35 U.S.C. 154(b) by 417 days.

(21) Appl. No.: 12/793,861

(22) Filed: Jun. 4, 2010

(65) Prior Publication Data

US 2010/0323751 A1 Dec. 23, 2010

(30) Foreign Application Priority Data

Jun. 18, 2009 (JP) ................................. 2009-144898

(51) Int. Cl.
*G01D 11/28* (2006.01)

(52) U.S. Cl. ............. 362/26; 362/30; 362/608; 362/612

(58) Field of Classification Search .............. 362/23–30, 362/608, 612; 200/310–317
See application file for complete search history.

(56) References Cited

FOREIGN PATENT DOCUMENTS

JP 2009-099298 5/2009

*Primary Examiner* — Jason Moon Han
(74) *Attorney, Agent, or Firm* — Panasonic Patent Center

(57) ABSTRACT

A light guide sheet is adapted to be used with a light emitter. The light guide sheet includes a light-transmissive base, a light inlet section having bonded to a lower surface of the base, and an illumination section for diffusing the light entering into the base. The light inlet section has an upper surface and an edge surface connected to the upper surface. The upper surface of the light inlet section is bonded to the lower surface of the base. Light emitted from the light emitter enters into the edge surface the light inlet section. The light inlet section causes the entering light to enter into the base. The light inlet section has a refractive index lower than a refractive index of the base. The light guide sheet provides a movable contact assembly capable of reliably illumination inexpensively.

16 Claims, 6 Drawing Sheets

LIGHT GUIDE SHEET AND MOVABLE CONTACT ASSEMBLY USING THE SAME

FIELD OF THE INVENTION

The present invention relates to a light guide sheet mainly used for an operation of various electronic devices, and to a movable contact assembly including the light guide sheet.

BACKGROUND OF THE INVENTION

Electronic devices, especially portable terminal devices, such as portable telephones, have included an operation section illuminated by, e.g. light-emitting diodes or EL elements to identify push buttons and display sheets even in dark environments Light guide sheets and movable contact assemblies used in such devices have been required to permit various illuminations inexpensively.

FIGS. 6 and 7 are a sectional view and a plan view of a conventional switch 501 described in JP2009-99298A. Base 1 has a film shape and has a light-transmissive property. Plural protruding illuminating sections 2 are provided on a lower surface of base 1, thus forming light guide sheet 3.

A predetermined portion of an outer periphery of base sheet 4 is attached to a lower surface of light guide sheet 3 with an adhesive. Movable contact 5 has substantially a dome shape and is made of an electrically conductive thin metal sheet. Plural movable contacts 5 are attached to a lower surface of base sheet 4 beneath illumination sections 2, thus forming movable contact assembly 6.

Circuit board 7 has plural wiring patterns formed on upper and lower surfaces thereof. Plural fixed contacts 8 are provided on the upper surface of circuit board 7. Fixed contacts 8 include central fixed contact 8A having substantially a circular shape and outer fixed contacts 8B substantially a horseshoe or ring shape surrounding central fixed contact 8A.

A predetermined portion of an outer periphery of movable contact assembly 6 is attached to the upper surface of circuit board 7 with adhesive layer 9. An outer periphery of movable contact 5 is placed on outer fixed contacts 8B. The center of the lower surface of movable contact 5 faces central fixed contact 8A with a predetermined gap.

Light emitter 10 is implemented by a light source, such as a light emitting diode. Plural light emitters 10 are mounted on the upper surface of circuit board 7 at the side of light guide sheet 3. Light emitter 10 has a light-emitting surface facing an edge surface of cutout 11A at an edge of base 1. Reflection sheet 11 is attached so as to cover the upper surface of cutout 11A and light emitter 10. Reflection sheet 11 is made of film having light-reflective material, such as aluminum, vapor-deposited thereon.

Display sheet 12 is light-transmissive and has a film shape. Light blocking section 112A is formed on the lower surface of display sheet 12 by, for example, printing. Predetermined portions of light blocking section 112A are punched out in shapes of, for example, characters or symbols, thus forming plural display sections 112B. Display sections 112B are disposed on the upper part of illumination sections 2 of light guide sheet 3, thus providing switch 501.

Switch 501 is mounted on an operation surface of an electronic device, such as a portable telephone. Plural central fixed contacts 8A, outer fixed contacts 8B, and plural light emitters 10 are connected to an electric circuit of the electronic device via wiring patterns.

An operation of conventional switch 501 will be described below. When a predetermined display section 112B of display sheet 12 is pressed down, light guide sheet 3 and base sheet 4 that are located below the pressed section bend downward, thereby pressing down the dome-shaped central part of movable contact 5. When a predetermined pressing power is applied, movable contact 5 is elastically reversed downward with a click feeling, causing the center of the lower surface of movable contact 5 to contact central fixed contact 8A. Thus, central fixed contact 8A and outer fixed contacts 8B are connected electrically via movable contact 5.

Furthermore, when the downward pressure to display sheet 12 is released, movable contact 5 is elastically reversed upward by an elastic returning force, causing the center of the lower surface of movable contact 5 to depart from central fixed contact 8A. Thereby, central fixed contact 8A and outer fixed contacts 8B are electrically disconnected from each other.

According to such electrical connection and disconnection of fixed contacts 8, functions of the electronic device are switched. When electric power is supplied to light emitters 10 from the electronic circuit of the electronic device according to such electrical connection and disconnection of fixed contacts 8, plural light emitters 10 emit light. The light enters into light guide sheet 3 from the edge surface thereof and transmits inside base 1 while it is reflected.

The light is further reflected from plural illumination sections 2 to illuminate display sections 112B from below. Since plural display sections 112B are illuminated, a user can identify the displayed characters and symbols on display section 112B even in dark environments, and thus can executing out operations easily.

In conventional movable contact assembly 6 and switch 501, in order to prevent light from leaking to the upper part of light emitter 10, plural reflection sheets 11 as separate components are attached on the upper surfaces of cutouts 11A and light emitters 10 at an edge of base 1. Therefore, the number of components is increased, and the time required for assembly is increased. As a result, switch 501 becomes more expensive.

SUMMARY OF THE INVENTION

A light guide sheet is adapted to be used with a light emitter. The light guide sheet includes a light-transmissive base, a light inlet section having bonded to a lower surface of the base, and an illumination section for diffusing the light entering into the base. The light inlet section has an upper surface and an edge surface connected to the upper surface. The upper surface of the light inlet section is bonded to the lower surface of the base. Light emitted from the light emitter enters into the edge surface the light inlet section. The light inlet section causes the entering light to enter into the base. The light inlet section has a refractive index lower than a refractive index of the base.

The light guide sheet provides a movable contact assembly capable of reliably illumination inexpensively

DETAILED DESCRIPTION OF PREFERRED EMBODIMENT

Figure 1A:
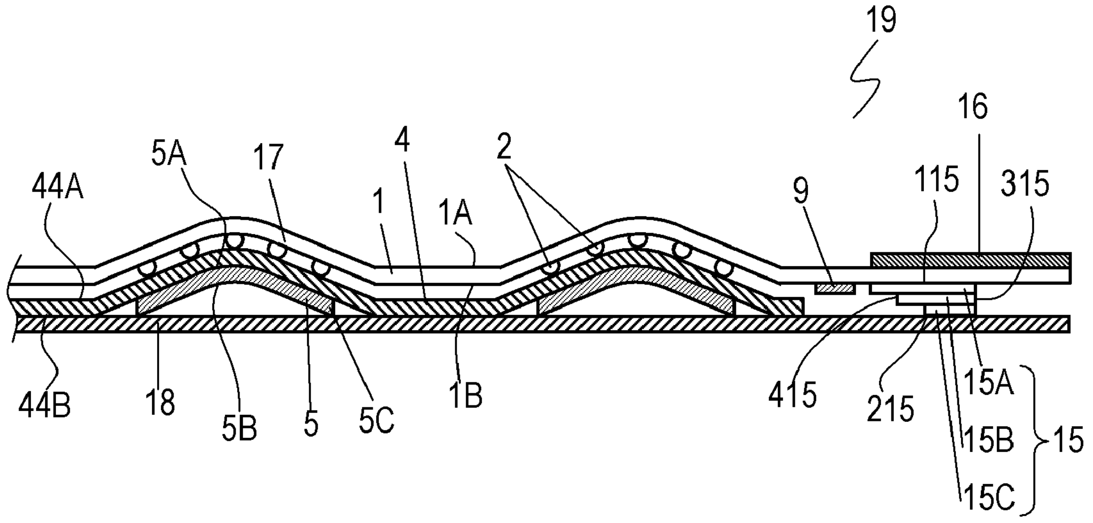
FIG. 1A is a sectional view of a movable contact assembly in accordance with an exemplary embodiment of the present invention.

FIG. 1A is a sectional view of movable contact assembly 19 in accordance with an exemplary embodiment of the present invention. Base 1 has a film shape and is made of flexible light-transmissive material, such as polyurethane, silicone or styrene. Plural illumination sections 2 have projections having a dot shape and are made of resin, such as polyester resin or epoxy resin, having white or milk-white color. Illumination sections 2 are provided on lower surface 1B of base 1 by, for example, printing.

Light inlet section 15 is provided on an end of lower surface 1B of base 1. Light inlet section 15 is made of light-transmissive material, such as epoxy, polyester or fluorocarbon resin, by, for example, printing. Light inlet section 15 has a thickness ranging from 0.1 mm to 0.2 mm. Light inlet section 15 has a refractive index lower than that of base 1. Light inlet section 15 has upper surface 115 bonded to lower surface 1B of base 1, lower surface 215 opposite to upper surface 115, edge surface 315 connected to upper surface 115 and lower surface 215, and edge surface 415 opposite to edge surface 315.

Adhesive layer 9 made of acrylic or silicone adhesive agent is formed on lower surface 1B of base 1. Adhesive layer 9 faces edge surface 415 of light inlet section 15. Reflective layer 16 is formed on upper surface 1A of base 1 by, for example, printing. Reflective layer 16 faces light inlet section 15 via base 1, and is located at the opposite side to light inlet section 15. Base 1, illumination sections 2, light inlet section 15 and reflective layer 16 constitute light guide sheet 17.

Base sheet 4 is made of resin film, such as polyethylene terephthalate film. Movable contact 5 is made of an electrically conductive thin metal sheet, such as a copper alloy sheet or a steel sheet. Movable contact 5 has convex upper surface 5A, concave lower surface 5B opposite to upper surface 5A, and outer periphery 5C. Upper surface 5A of movable contacts 5 is attached to lower surface 44B of base sheet 4. A predetermined portion of the outer periphery of base sheet 4 is attached to lower surface 1B of base 1 of light guide sheet 17 with adhesive agent, such as acrylic or silicone adhesive agent. Movable contact 5 is located at the opposite side to illumination sections 2, and faces illumination sections 2 across base sheet 4.

Separator 18 is made of removable film of, for example, polyethylene terephthalate. Separator 18 is attached to lower surface 44B so as to cover an entire surface of lower surface 44B of base sheet 4 to prevent dust or the like from adhering to lower surface 5B of movable contacts 5 during storage or transportation, thus providing movable-contact assembly 19.

Figure 1B:
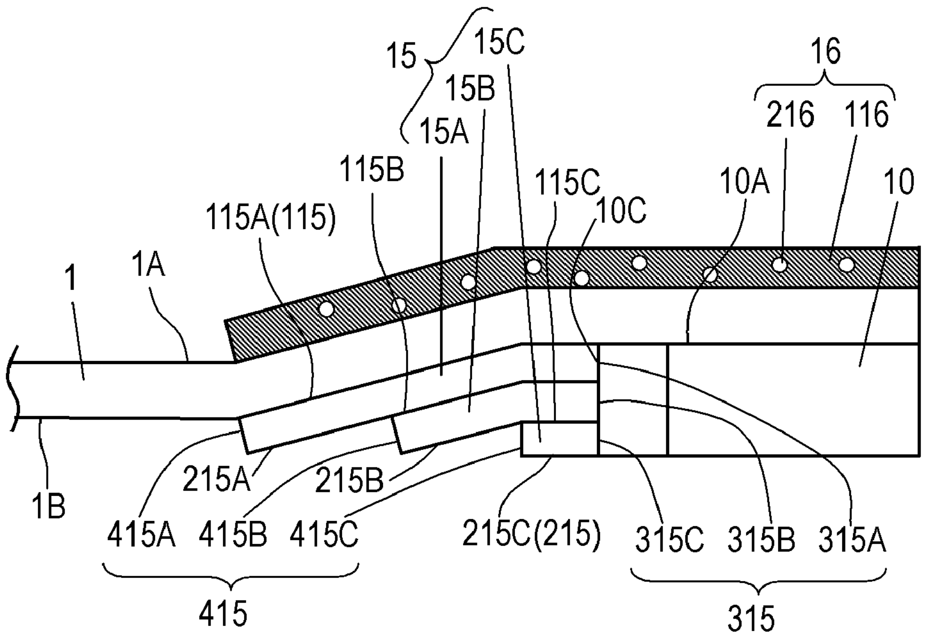
FIG. 1B is an enlarged sectional view of the movable contact assembly in accordance with the embodiment.

FIG. 1B is an enlarged sectional view of movable contact assembly 19 and illustrates light inlet section 15. Light inlet section 15 includes light guide layers 15A to 15C which are stacked. Light guide layer 15A has upper surface 115A bonded to lower surface 1B of base 1, lower surface 215A opposite to upper surface 115A, edge surface 315A connected to upper surface 115A and lower surface 215A, and edge surface 415A opposite to edge surface 315A. Upper surface 115A of light guide layer 15A constitutes upper surface 115 of light inlet section 15. Light guide layer 15B has upper surface 115B bonded to lower surface 215A of light guide layer 15A, lower surface 215B opposite to upper surface 115B, edge surface 315B connected to upper surface 115B and lower surface 215B, and edge surface 415B opposite to edge surface 315B. Light guide layer 15C has upper surface 115C bonded to lower surface 215B of light guide layer 15B, lower surface 215C opposite to upper surface 115C, edge surface 315C connected to upper surface 115C and lower surface 215C, and edge surface 415C opposite to edge surface 315C. Lower surface 215C of light guide layer 15C constitutes lower surface 215 of light inlet section 15. Edge surfaces 315A to 315C of light guide layers 15A to 15C constitute edge surface 315 of light inlet section 15. Edge surfaces 415A to 415C of light guide layers 15A to 15C constitute edge surface 415 of light inlet section 15. That is, edge surface 315 of light inlet section 15 includes edge surfaces 315A to 315C of light guide layers 15A to 15C, and edge surface 415 of light inlet section 15 includes edge surfaces 415A to 415C of light guide layers 15A to 15C. Light guide layer 15A has a refractive index lower than that of base 1. Light guide layer 15B has a refractive index lower than that of light guide layer 15A. Light guide layer 15C has a refractive index lower than that of light guide layer 15B. According to this embodiment, base 1 is made of polyurethane having a refractive index of about 1.51. Light guide layer 15A is made of polyester having a refractive index of about 1.50. Light guide layer 15B is made of fluorocarbon resin having a refractive index of about 1.40. Reflective layer 16 includes insulating resin 116, such as polyester or epoxy, and light-reflective powders 216, such as aluminum or silver, dispersed in insulating resin 116.

Figure 2A:
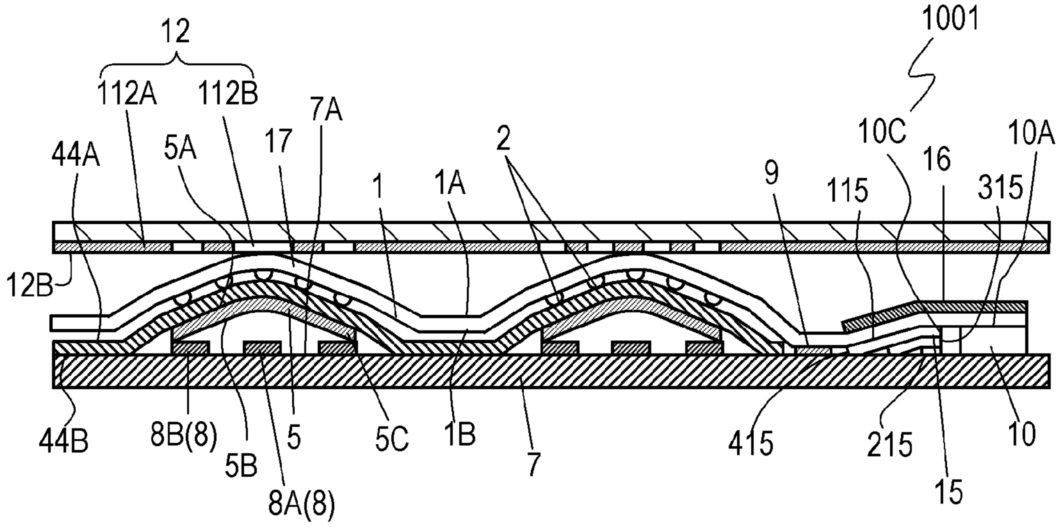
FIG. 2A is a sectional view of a switch in accordance with the embodiment.
Figure 2B:
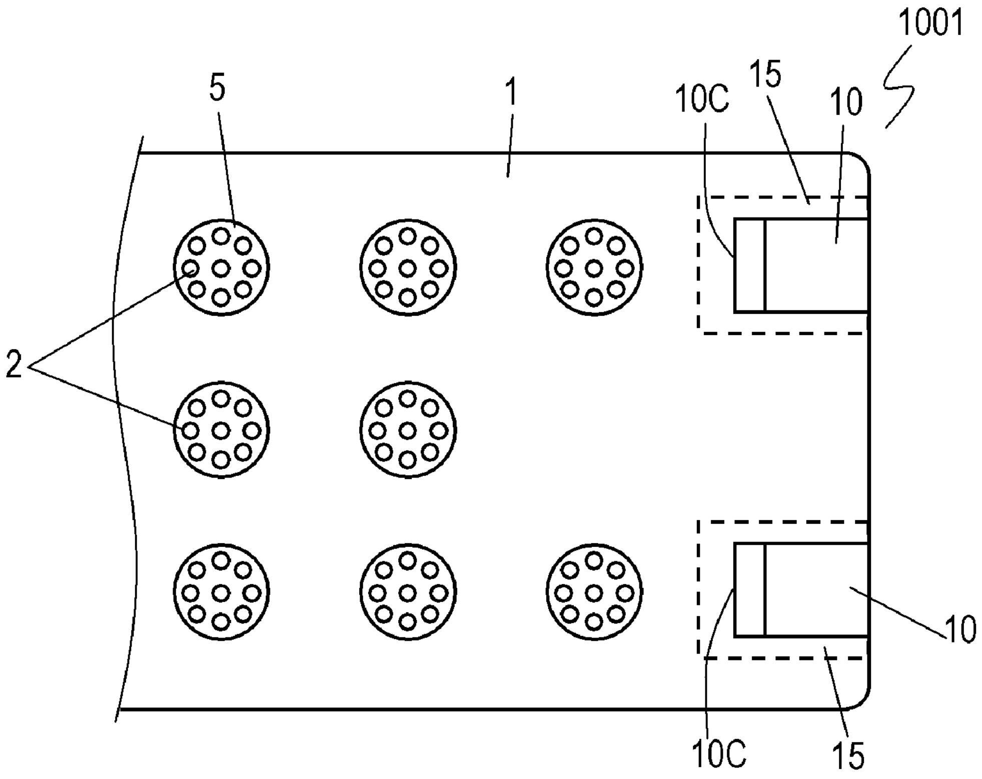
FIG. 2B is a plan view of the switch in accordance with the embodiment.

FIGS. 2A and 2B are a sectional view and a plan view of switch 1001 including movable contact assembly 19 in accordance with the embodiment, respectively. Circuit board 7 is made of insulation film, such as polyethylene terephthalate film or polycarbonate film, or includes an insulating plate made of paper phenol or glass epoxy. Plural wiring patterns made of conductive material, such as copper, are formed on upper surface 7A and lower surface 7B of circuit board 7. Fixed contacts 8 made of conductive material, such as copper or carbon, are formed on upper surface 7A. Fixed contacts 8 include central fixed contact 8A and outer fixed contacts 8B surrounding central fixed contact 8A. Central fixed contact 8A has substantially a circular shape. Outer fixed contacts 8B has a horseshoe shape or a ring shape.

Separator 18 is peeled off from movable contact assembly 19 shown in FIG. 1. Then, lower surface 44B of base sheet 4 of movable contact assembly 19 and adhesive layer 9 are bonded to upper surface 7A of circuit board 7. Outer periphery 5C of movable contact 5 is placed on outer fixed contacts 8B. Lower surface 5B of movable contact 5 faces central fixed contact 8A with predetermined gap between the contacts.

Light emitter 10 is implemented by a light-emitting device, such as a light-emitting diode, and has light-emitting surface 10C from which light is emitted. Light emitter 10 is mounted on upper surface 7A of circuit board 7 such that light-emitting surface 10C faces edge surface 315 of light inlet section 15. Lower surface 1B of base 1 covers upper surface 10A of light emitter 10.

Display sheet 12 is made of light-transmissive film. Light blocking section 112A is formed on lower surface 12B of display sheet 12 by, for example, printing. Portions of display sheet 12 exposed from light blocking section 112A have shapes of characters or symbols, and form light-transmissive display section 112B. Display section 112B faces illumination sections 2 of light guide sheet 17, thus providing switch 1001.

Thus, light guide sheet 17 is used together with light emitter 10. Light-transmissive base 1 has a film shape and has lower surface 1B. Light inlet section 15 has upper surface 115 bonded to lower surface 1B of base 1, and edge surface 315 connected to upper surface 115. Light emitted from light emitter 10 enters into edge surface 315. Light inlet section 315 allows the light to enter into base 1. Illumination section 2 diffuses the light entering into base 1. Light inlet section 15 has a refractive index lower than that of base 1.

Figure 3:
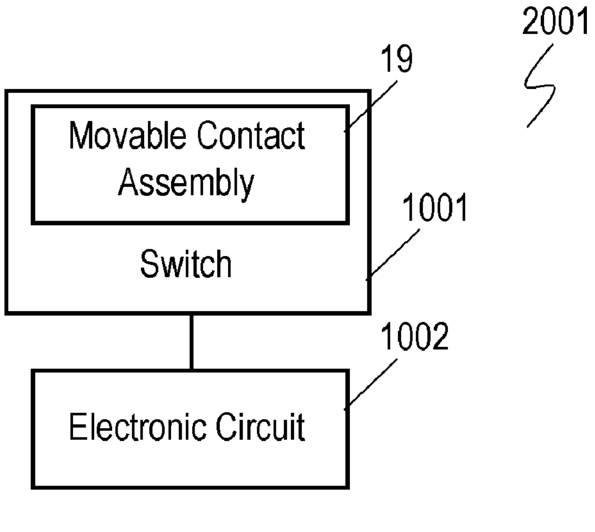
FIG. 3 is a block diagram of an electronic device in accordance with the embodiment.

FIG. 3 is a block diagram of electronic device 2001, such as portable telephone, in accordance with this embodiment. Switch 1001 is mounted on an operation panel of electronic circuit 2001. Central fixed contacts 8A, outer fixed contacts 8B, light emitters 10 are connected to electric circuit 1002 via the wiring patterns.

An operation of switch 1001 will be described. When a user presses down a predetermined display section 112B of display sheet 12, light guide sheet 17 and base sheet 4 that are located below the pressed section bend downward, thereby pressing down the center of movable contact 5. When a pressing force larger than a predetermined level is applied, movable contact 5 is elastically reversed downward with a click feeling, and causes the center of the lower surface of movable contact 5 to contact central fixed contact 8A, thereby connecting central fixed contact 8A electrically to outer fixed contacts 8B via movable contact 5.

When the pressing force applied to display sheet 12 is released, movable contact 5 is elastically reversed upward by its elastic returning force, and causes the center of the upper surface of movable contact 5 to depart from central fixed contact 8A, thereby disconnecting central fixed contact 8A electrically from outer fixed contacts 8B.

The electrical connection and disconnection of fixed contacts 8 switch functions of electric device 2001, and allows electronic circuit 1002 to supply a power to light emitters 10 to cause light emitters 10 to emit light from light-emitting surfaces 10C. The emitted light enters into edge surface 315 of light inlet section 15, enters from light inlet section 15 to the inside of light guide sheet 17, and transmits in base 1 while being reflected.

The entering light is diffused at illumination sections 2 to illuminate display section 112B of display sheet 12 from below. When display section 112B is illuminated, the user can easily identify displayed characters or symbols even in dark environments, thus operating electronic device 2001 easily.

Figure 4A:
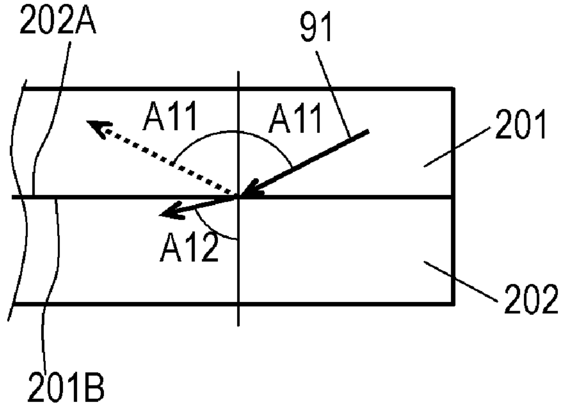
FIGS. 4A and 4B are partial sectional views of a light guide sheet of the movable contact assembly in accordance with the embodiment.
Figure 4B:
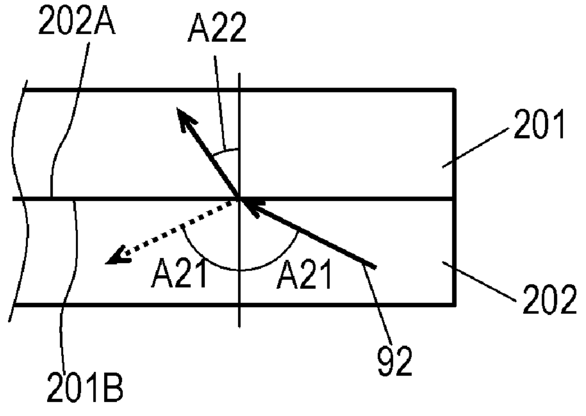

An operation of light inlet section 15 will be described below. FIGS. 4A and 4B are partial sectional views of light inlet section 15 of light guide sheet 17 for illustrating an operation of light inlet section 15. FIGS. 4A and 4B illustrate higher refractive index layer 201 and lower refractive index layer 202 which are stacked. Lower refractive index layer 202 has a refractive index lower than that of higher refractive index layer 201. Surface 201B of higher refractive index layer 201 is bonded to surface 202A of lower refractive index layer 202. In movable contact assembly 19 shown in FIGS. 1A and 1B, in the case that higher refractive index layer 201 corresponds to base 1, lower refractive index layer 202 corresponds to light guide layer 15A of light inlet section 15. In the case that higher refractive index layer 201 corresponds to light guide layer 15A, lower refractive index layer 202 corresponds to light guide layer 15B. In the case that higher refractive index layer 201 corresponds to light guide layer 15B, lower refractive index layer 202 corresponds to light guide layer 15C.

As shown in FIG. 4, light 91 enters from surface 201B of higher refractive index layer 201 to surface 202A of lower refractive index layer 202 at incident angle A11. The light is reflected from surface 202A at angle A11, and enters into lower refractive index layer 202 from surface 202A at angle A12 larger than angle A11.

On the other hand, as shown in FIG. 4B, light 92 enters from surface 202A of lower refractive index layer 202 to surface 201B of higher refractive index layer 201 at incident angle A21. The light is reflected from surface 201B at angle A21 and enters into higher refractive index layer 201 at angle A22 smaller than angle A21. Thus, the light entering into lower refractive index layer 202 at incident angle A21 enters easily into higher refractive index layer 201 at angle A22 smaller than angle A21.

Figure 5:
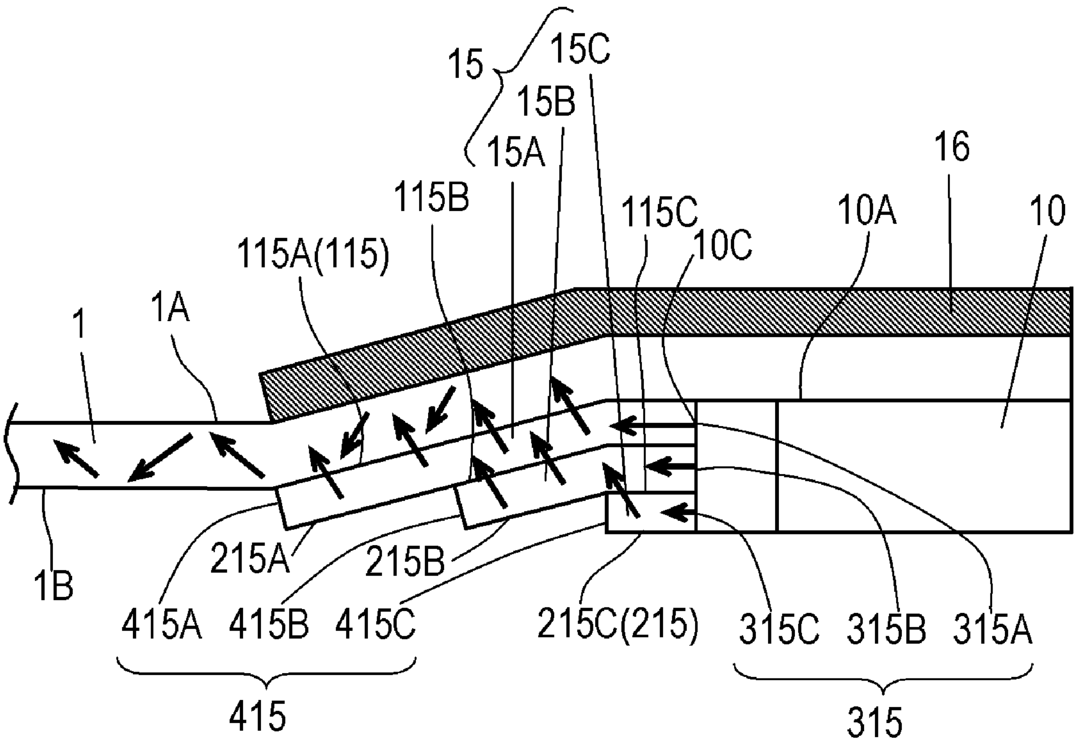
FIG. 5 is an enlarged sectional view of the light guide sheet in accordance with the embodiment.
Figure 6:
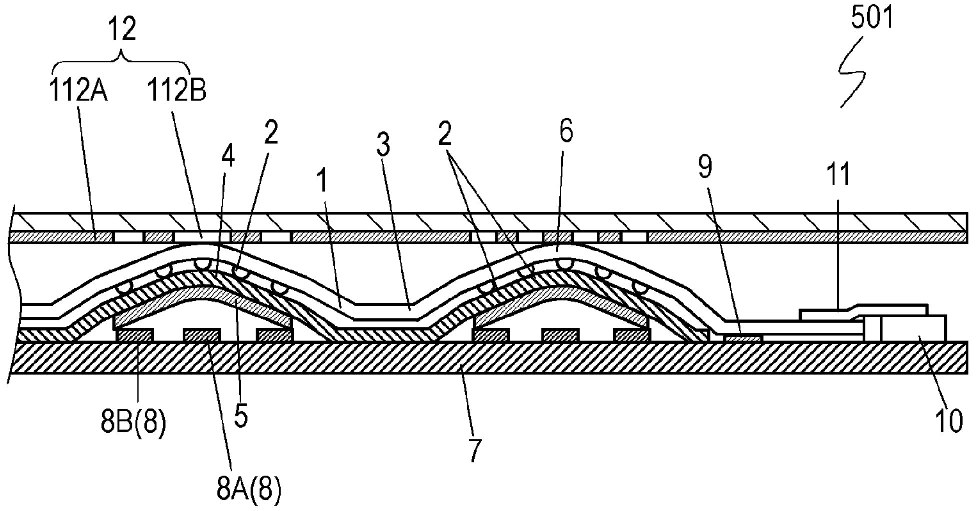
FIG. 6 PRIOR ART
FIG. 6 is a sectional view of a conventional switch.
Figure 7:
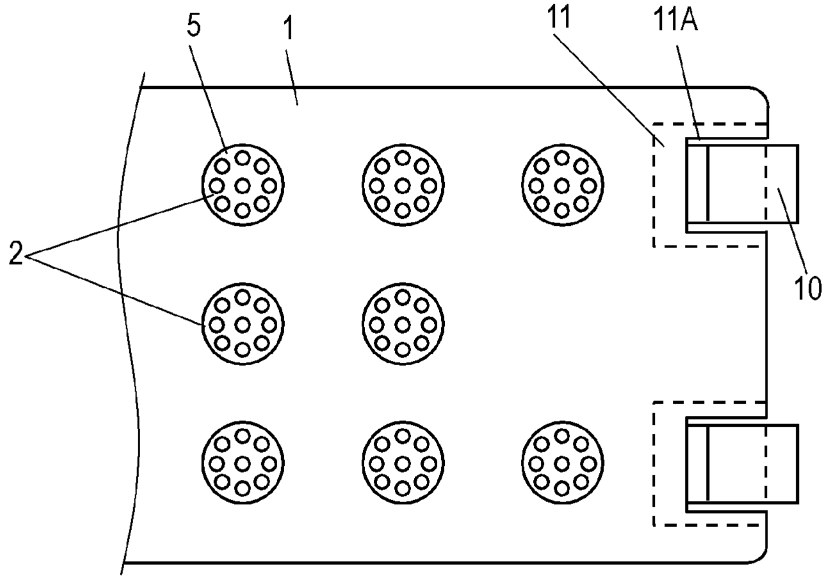
FIG. 7 PRIOR ART
FIG. 7 is a plan view of a conventional switch.

FIG. 5 is a partial sectional view of light guide sheet 17. The light emitted from light-emitting surface 10C of light emitter 10 enters into edge surface 315 of light inlet section 15 facing light-emitting surface 10C, that is, edge surfaces 315A to 315C of light guide layers 15A to 15C. The light entering from edge surface 315A of light guide layer 15A enters into base 1 having a higher refractive index. The light entering from edge surface 315B of light guide layer 15B enters into light guide layer 15A having a higher refractive index. The light entering from edge surface 315C of light guide layer 15C enters into light guide layer 15B having a higher refractive index, enters into light guide layer 15A having a further higher refractive index, and enters into base 1 having a still further higher refractive index. Thus, almost all light entering into edge surface 315, that is, edge surfaces 315A to 315C, enters into base 1 without loss, and illuminates illumination sections 2.

Edge surfaces 315A to 315C of light guide layers 15A to 15C are flush with each other to form edge surface 315 of light inlet section 15. The length from edge surface 315B to edge surface 415B opposite to edge surface 315B of light guide layer 15B is shorter than the length from edge surface 315A to edge surface 415A opposite to edge surface 315A of light guide layer 15A. Furthermore, the length from edge surface 315C to edge surface 415C opposite to edge surface 315C of light guide layer 15C is shorter than the length from edge surface 415B to edge surface 315B of light guide layer 15B. This structure, as shown in FIG. 2A, allows base 1 and light guide layers 15A and 15B to bend, and allows lower surfaces 1B, 215A, and 215B to obliquely bend while lower surface 1B of base 1 is bonded to upper surface 7A of circuit board 7. In this structure, light emitted from light emitter 10 enters into lower surface 1B of base 1 obliquely with respect to lower surface 1B of base 1, enters into lower surface 215A of light guide layer 15A obliquely with respect to lower surface 215A, and enters into lower surface 215B of light guide layer 15B obliquely with respect to lower surface 215B.

Reflective layer 16 facing light inlet section 15 across base 1 reflects the light entering from light guide layers 15A, 15B, and 15C to the inside of base 1, and allows the reflected light to transmit in base 1 without a leak from base 1.

Light inlet section 15 allows the light to enter into base 1 reliably. Reflective layer 16 allows the light entering into base 1 to transmit in base 1 reliably, to illuminate illumination sections 2 brightly and reliably.

Reflective layer 16 and light inlet section 15 are formed on upper surface 1A of base 1 and lower surface 1B of base 1, respectively, such that they are formed unitarily with each other by, for example, printing, thereby constituting light guide sheet 17. Consequently, separated components, such as a reflection sheet, are not needed. Furthermore, only by attaching movable contact assembly 19 to upper surface 7A of circuit board 7 on which light emitter 10 is mounted with adhesive layer 9, switch 1001 can be fabricated easily and inexpensively.

In movable contact assembly 19 shown in FIG. 1A, light inlet section 15 includes plural, three light guide layers 15A to 15C having different refractive indexes. Light guide layers 15A to 15C have edge surfaces 315A to 315C into which the light emitted from light-emitting surface 10C enters, respectively. Light inlet section 15 according to this embodiment may include only a single light guide layer. However, light inlet section 15 is formed by stacking light guide layers 15A to 15C. This structure allows light guide layers 15A to 15C to have different refractive indexes, and allows the height of edge surface 315 of light inlet section 15 to be close to the light emitter 10 by a relatively simple method, such as a screen printing method. For example, in the case that the thickness of each of the light inlet layers is 50 μm by the screen printing method, if four light guide layers are printed to form light inlet section 15, the height of entire light inlet section 15 can be about 0.2 mm close to the height of light emitter 10. Thus, almost all the light from light-emitting surface 10C of light emitter 10 can be introduced into base 1 from edge surface 315 (315A to 315C) without a loss, hence performing bright illumination.

Illumination sections 2 can be formed on lower surface 1B of base 1 by printing. However, illumination sections 2 can be formed on upper surface 1A of base 1, providing the same effects. Furthermore, illumination sections 2 can be formed by methods other than printing, such as adhesion, inkjet method, laser processing, pressing processing, or molding processing.

According to the embodiment, terms, such as "upper surface" and "lower surface", indicating directions indicates relative directions that depend upon only the relative positional relation of the components, such as base 1 and light inlet section 15, of light guide sheet 17, and do not indicate absolute directions, such as a vertical direction.

What is claimed is:

1. A light guide sheet adapted to be used with a light emitter for use within a movable contact assembly, said light guide sheet comprising:
- a base having a film shape and having a lower surface, the base being light-transmissive;
- a light inlet section including a plurality of light guide layers having an upper surface and an edge surface connected to the upper surface, the upper surface of the light inlet section being bonded to the lower surface of the base, wherein light emitted from the light emitter enters into the edge surface of the light inlet section, and the light inlet section causes the entering light to enter into the base; and
- an illumination section adapted to diffuse the light entering into the base,
- wherein the light inlet section has a refractive index lower than a refractive index of the base, and
- wherein the light emitted from the light emitter enters into the lower surface of the base obliquely with respect to the lower surface of the base.

2. The light guide sheet of claim 1, wherein the illumination section includes a plurality of projections.

3. The light guide sheet of claim 1, wherein
- the plurality of light guide layers of the light inlet section include
  - a first light guide layer having a first upper surface, a first lower surface opposite to the first upper surface, and a first edge surface connected to the first upper surface and the first lower surface, the first upper surface of the first light guide layer being bonded to the lower surface of the base, the first light guide layer having a refractive index lower than the refractive index of the base, and
  - a second light guide layer having a second upper surface, a second lower surface opposite to the second upper surface, and a second edge surface connected to the second upper surface and the second lower surface, the second upper surface being bonded to the first lower surface of the first light guide layer, the second light guide layer having a refractive index lower than the refractive index of the first light guide layer,
- the edge surface of the light inlet section includes the first edge surface of the first light guide layer and the second edge surface of the second light guide layer, and
- the light emitted from the light emitter enters into the first edge surface of the first light guide layer and the second edge surface of the second light guide layer.

4. The light guide sheet of claim 3, wherein the light emitted from the light emitter enters into the first lower surface of the first light guide layer obliquely with respect to the first lower surface of the first light guide layer.

5. The light guide sheet of claim 3, wherein
- the plurality of light guide layers of the light inlet section further include a third light guide layer having a third upper surface, a third lower surface opposite to the third upper surface, and a third edge surface connected to the third upper surface and the third lower surface, the third upper surface being bonded to the second lower surface of the second light guide layer, the third light guide layer having a refractive index lower than a refractive index of the second light guide layer,
- the edge surface of the light inlet section includes the first edge surface of the first light guide layer, the second edge surface of the second light guide layer, and the third edge surface of the third light guide layer.

6. The light guide sheet of claim 5, wherein the light emitted from the light emitter enters into the first lower surface of the first light guide layer obliquely with respect to the first lower surface of the first light guide layer, and enters into the second lower surface of the second light guide layer obliquely with respect to the second lower surface of the second light guide layer.

7. A movable contact assembly adapted to be used with a light emitter, said movable contact assembly comprising:
- a base having a film shape and having a lower surface, the base being light-transmissive;
- a light inlet section including a plurality of light guide layers having an upper surface and an edge surface connected to the upper surface, the upper surface of the light inlet section being bonded to the lower surface of the base, wherein light emitted from the light emitter enters into the edge surface of the light inlet section, and the light inlet section causes the entering light to enter into the base;
- a illumination section adapted to diffuse the light entering into the base; and
- a movable contact provided on the illumination section,
- wherein the light inlet section has a refractive index lower than a refractive index of the base, and
- wherein the light emitted from the light emitter enters into the lower surface of the base obliquely with respect to the lower surface of the base.

8. The movable contact assembly of claim 7, wherein the movable contact is substantially dome-shaped.

9. The movable contact assembly of claim 7, wherein the illumination section includes a plurality of projections.

10. The movable contact assembly of claim 7, wherein the plurality of light guide layers of the light inlet section include a first light guide layer having a first upper surface, a first lower surface opposite to the first upper surface, and a first edge surface connected to the first upper surface and the first lower surface, the first upper surface of the first light guide layer being bonded to the lower surface of the base, the first light guide layer having a refractive index lower than the refractive index of the base, and a second light guide layer having a second upper surface, a second lower surface opposite to the second upper surface, and a second edge surface connected to the second upper surface and the second lower surface, the second upper surface being bonded to the first lower surface of the first light guide layer, the second light guide layer having a refractive index lower than the refractive index of the first light guide layer, the edge surface of the light inlet section includes the first edge surface of the first light guide layer and the second edge surface of the second light guide layer, and the light emitted from the light emitter enters into the first edge surface of the first light guide layer and the second edge surface of the second light guide layer.

11. The movable contact assembly of claim 10, wherein the light emitted from the light emitter enters into the first lower surface of the first light guide layer obliquely with respect to the first lower surface of the first light guide layer.

12. The movable contact assembly of claim 10, wherein the plurality of light guide layers of the light inlet section further include a third light guide layer having a third upper surface, a third lower surface opposite to the third upper surface, and a third edge surface connected to the third upper surface and the third lower surface, the third upper surface being bonded to the second lower surface of the second light guide layer, the third light guide layer having a refractive index lower than a refractive index of the second light guide layer, the edge surface of the light inlet section includes the first edge surface of the first light guide layer, the second edge surface of the second light guide layer, and the third edge surface of the third light guide layer.

13. The movable contact assembly of claim 12, wherein the light emitted from the light emitter enters into the first lower surface of the first light guide layer obliquely with respect to the first lower surface of the first light guide layer, and enters into the second lower surface of the second light guide layer obliquely with respect to the second lower surface of the second light guide layer.

14. An electronic device comprising:

a movable contact assembly adapted to be used with a light emitter, said movable contact assembly including:

a base having a film shape and having a lower surface, the base being light-transmissive;

a light inlet section including a plurality of light guide layers having an upper surface and an edge surface connected to the upper surface, the upper surface of the light inlet section being bonded to the lower surface of the base, wherein light emitted from the light emitter enters into the edge surface of the light inlet section, and the light inlet section causes the entering light to enter into the base;

an illumination section adapted to diffuse the light entering into the base; and a movable contact provided on the illumination section;

an electronic circuit operable to switch a function of the electronic device and being electrically connected to the moveable contact; and a fixed contact electrically connected to the electronic circuit and being disposed to electrically connect to, or electrically disconnect from, the movable contact according to a movement of the movable contact;

wherein the light inlet section has a refractive index lower than a refractive index of the base, and wherein the light emitted from the light emitter enters into the lower surface of the base obliquely with respect to the lower surface of the base.

15. The electronic device of claim 14, wherein the electronic device is a portable telephone.

16. The electronic device of claim 14, wherein the movable contact is substantially dome-shaped.

* * * * *